United States Patent [19]
Paros

[11] 3,783,693
[45] Jan. 8, 1974

[54] ABSOLUTE PRESSURE TRANSDUCER

[76] Inventor: Jerome M. Paros, 15109 N.E. 68th St., Redmond, Wash. 98052

[22] Filed: Feb. 17, 1971

[21] Appl. No.: 115,954

Related U.S. Application Data

[63] Continuation-in-part of Ser. No. 4,576, Jan. 21, 1970, Pat. No. 3,664,237.

[52] U.S. Cl.................... 73/398 C, 73/393, 73/407
[51] Int. Cl........................ G01l 9/12, G01l 19/04
[58] Field of Search.............. 73/393, 407, 398 C, 73/410; 267/180; 308/2 A; 92/1, 37, 39

[56] References Cited
UNITED STATES PATENTS

| | | | |
|---|---|---|---|
| 3,211,004 | 10/1965 | Spencer | 73/398 R |
| 3,602,047 | 8/1971 | Kistler | 73/398 C |
| 2,511,094 | 6/1950 | Barkas | 73/368.7 X |
| 3,177,720 | 4/1965 | Metheny | 73/393 X |

Primary Examiner—Donald O. Woodiel
Attorney—Le Blanc & Shur

[57] ABSTRACT

Disclosed is an absolute pressure transducer including a mechanical assembly comprising an open bellows, a suspension system, and a sealed bellows arranged to yield a torque about a single sensitive axis when pressure is applied to the open bellows and an electronic circuit comprising a detector for sensing angular motion and a torquing device to restore the mechanical assembly toward its null position. The amount of electrically generated torque necessary to balance the pressure induced torque is proportional to, and a measure of, the applied pressure.

4 Claims, 12 Drawing Figures

INVENTOR
JEROME M. PAROS

BY *LeBlanc and Shur*

ATTORNEYS.

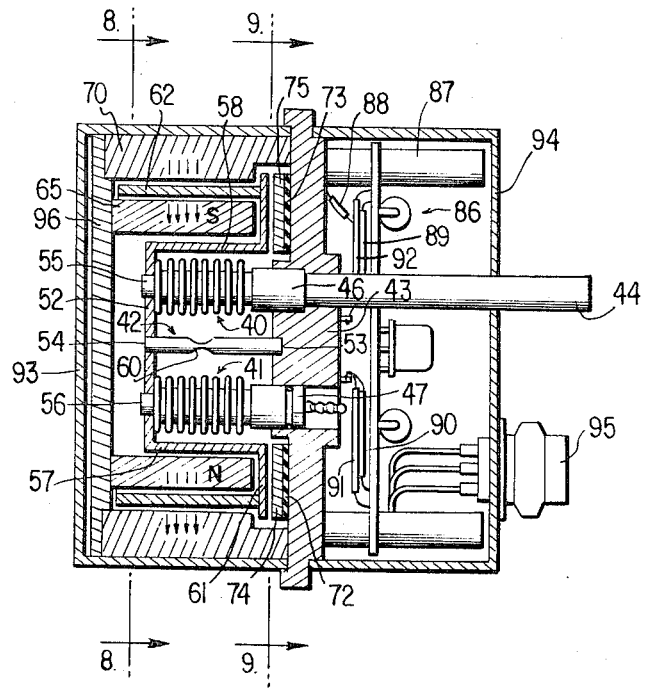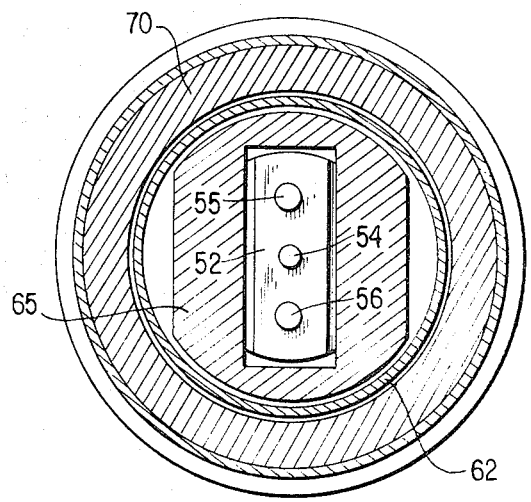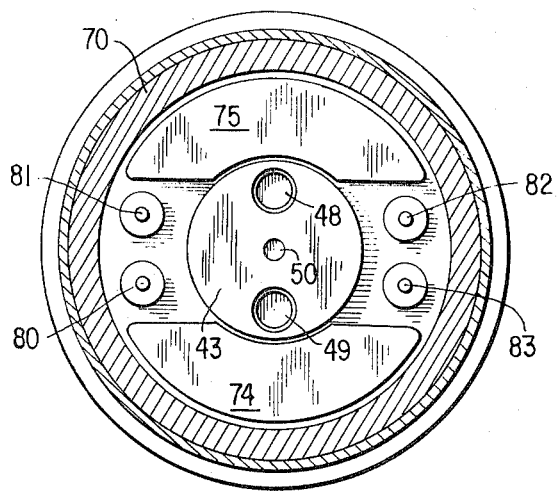

ABSOLUTE PRESSURE TRANSDUCER

This application is a continuation-in-part of copending application Ser. No. 4,576, filed Jan. 21, 1970, now U.S. Pat. No. 3,664,237.

This invention relates to an improved pressure transducer incorporating a novel pressure sensor and, more particularly, to a transducer of the force feedback type having improved accuracy, sensitivity, small size, and increased ruggedness. The pressure sensor and pressure transducer may be used in various configurations to measure absolute pressure. The pressure sensor comprises a symmetrical arrangement of a bellows sealed at two ends, and another bellows with one sealed and one open end, both attached to a suspension system such that when pressure is applied to the open bellows end, a torque is produced about the pivot point of the suspension system. In the complete transducer, a center torque to restrain the instrument at its null position is generated by a feedback or servo loop including detection and torque producing means.

Previous instruments in the field of pressure sensing (which operate in the range of from fractions of an atmosphere to several atmospheres) employ varying mechanical configurations of either Bourdon tubes, bellows, diaphragms, or liquid columns. In common usage is the Bourdon tube consisting of a thin flat tube sealed at one end which acts like a spring, extending with overpressures and curling up when underpressures are applied. The deflection produced may actuate a mechanical pointer or electronic display. These devices are not null seeking nor force balance type devices but must produce a deflection which is an indirect measure of the applied pressure.

Liquid column instruments include the U-tube manometer, well-type manometer, and inclined tube manometer. These instruments depend on the height of a liquid column to indicate the pressure head. They are not readily adapted to recording instruments, have slow response times, and are not small, self-contained sensors.

Metal diaphragm type devices are usually used in special applications, such as fast response dynamic gages, due to the extremely small deflections produced under applied pressure. Larger deflections are produced with plastic or fabric diaphragms; however, these are not amenable to the production of precision measuring devices.

Bellows have been employed in pressure sensors of the servo or force balance type instruments. In one such instrument, a force is produced by a bellows-mechanical linkage assembly under applied pressure, the motion sensed and the instrument kept at its null position by a forcing device whose magnitude is proportional to the unbalance force. Devices of this type are extremely sensitive to linear acceleration.

In order to overcome these and other problems, there is disclosed in assignee's copending application Ser. No. 812,193, filed Apr. 1, 1969, assignee's copending application Ser. No. 836,004, filed June 24, 1969, and my copending application Ser. No. 4,576, filed Jan. 21, 1970, certain bellows-pivot arrangements which have proven quite satisfactory as differential pressure transducers. The disclosures of these applications are incorporated herein by reference The present invention is directed to a device of the same general type as disclosed in those applications, but one which is particularly adapted for use as an absolute gage with improved temporal stability and improved accuracy.

The present invention provides a pressure sensor with a stress-free suspension system, temperature compensation scheme, and greater range utilization than in previous constructions. It forms a small self-contained, highly precise sensor capable of operation over a large pressure range from fractions of an atmosphere to several atmospheres. The pressure sensor may be balanced so as to render it insensitive to linear accelerations by placing the sensor center of gravity at the pivot point. The pivot is extremely flexible about the sensitive axis, thus making possible the measurement of very slight changes in absolute pressure. High ridigity of the suspension system about the two other mutually perpendicular axes decreases the sensitivity to cross axis forces and increases the instrument's ruggedness and reliability. Incorporation of the bellows-pivot arrangement into a servo or force feedback system yields a direct measurement of the applied pressure.

According to a preferred embodiment of the present invention, an open bellows-sealed bellows arrangement, symmetrically placed about a pivot point, is attached at one end to a movable plate forming part of a capacitive pickoff. The electrical restoring torque which counteracts the unbalanced pressure produced torque is generated by passage of a current through an annular forcer coil mounted on the moving plate while positioned in the field of a permanent magnet. The forcer coil is connected through an electrical circuit to a capacitive pickoff, which includes the movable plate, such that the coil forms a part of the feedback or servo loop and the current flowing in the coil necessary to maintain the torque balance is proportional to the applied pressure.

It is, therefore, one object of the present invention to provide an improved absolute pressure transducer.

Another object of the present invention is to provide an improved pressure sensor in the form of an open bellows-sealed bellows-suspension system arrangement.

Another object of the present invention is to provide a pressure sensor which produces an output indicative of torque rather than displacement.

Another object of the present invention is to provide an absolute pressure sensor with a stress-free suspension system.

Another object of the present invention is to provide an absolute pressure sensor with a unique temperature compensation scheme.

Another object of the present invention is to provide an absolute pressure sensor assembled in a manner such as to increase its effective range of operation.

Another object is to provide a pressure sensor balanced about all axes so as to be insensitive to external forces.

Another object of the invention is to provide an improved servo loop type absolute pressure transducer incorporating an open bellows-sealed bellows-pivot arrangement.

Another object of the present invention is to provide a servo pressure transducer which measures torque rather than displacement and which incorporates as part of the transducer a forcer coil and capacitive pickoff including a movable plate attached to a bellows-pivot arrangement.

These and further objects and advantages of the invention will be more apparent upon reference to the following specification, claims, and appended drawings, wherein:

FIG. 7 is an elevational view, with parts in section, showing an overall absolute pressure transducer constructed in accordance with the present invention;

FIG. 8 is a cross section taken along line 8—8 of FIG. 7;

FIG. 9 is a cross section taken along line 9—9 of FIG. 7;

Figure 1:
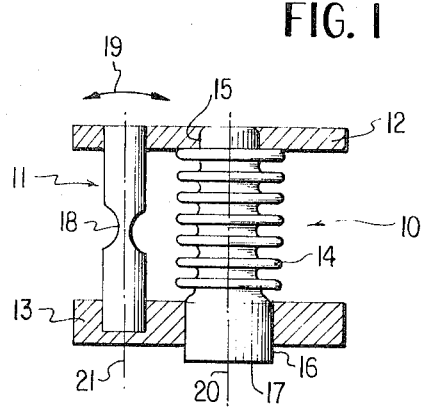
FIG. 1 shows an open bellows-pivot assembly constructed in accordance with the present invention.

Referring to the drawings, FIG. 1 shows a bellows-pivot assembly constructed in accordance with the present invention comprising a metal bellows 10 separated from a flexure hinge pivot 11 and connected together by plates 12 and 13. The bellows is provided with a series of corrugations or convolutions 14 and is sealed at one end by an end cap 15 which may be formed integral with the corrugations or joined as a separate plug. The other end of the bellows is provided with a straight tubular section 16 terminating in an open end 17 adapted to receive a pressure fluid, such as air, gas, liquid, or the like. The pivot is a flexure hinge formed from round or rectangular stock with a locally necked-down portion 18. The flexure is extremely compliant about one axis and flexes easily in the direction shows by double-ended arrow 19 upon application of bending forces generated by the application or withdrawal of pressure in the bellows through port 17; however, the flexure is quite stiff about the two nonsensitive mutually perpendicular axes and is thus unresponsive to external forces along those axes. Plates 12 and 13 form the connecting assembly between the bellows and pivot, thus setting the nominal moment arm, or distance between the centerline 20 and the bellows and centerline 21 of the flexure, over which the pressure induced force acts. The bellows and flexure are made from the same or similar materials, such as stainless steel, copper, or the like, so as to minimize errors induced by differential temperature growth. The flexure pivot and bellows are connected to the plates 12 and 13 by solder, welding, brazing, or the like.

Figure 2:
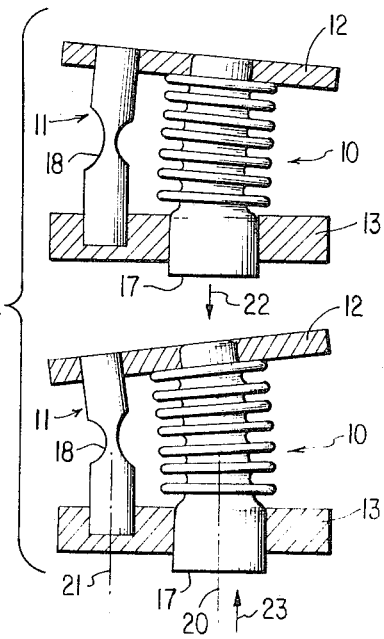
FIG. 2 illustrates the operation of the bellows-pivot assembly of FIG. 1 when subjected to overpressure and underpressure.

FIG. 2 shows the deflection of top plate 12 relative to the fixed bottom plate 13 when the bellows 10 is subjected to both overpressure and underpressure. When fluid at a pressure above ambient, as indicated by arrow 23, is applied through the open end 17 of the bellows 10, the force generated in the bellows, acting over the distance between centerlines 20 and 21, produces a torque which deflects the assembly about the localized necked-down portion 18 of flexure hinge 11. The amount of deflection is proportional to the overpressure within the bellows. Similarly, when the bellows is evacuated to a pressure less than ambient, as indicated by arrow 22 in FIG. 2, then the deflection is in the opposite sense. By enclosing the bellows-pivot assembly in a housing and then evacuating and sealing the housing, an absolute pressure sensor may be formed. However, under normal operating or storage conditions, with the open port 17 exposed to the atmosphere, the susepnsion system and bellows would be in a cocked and stressed condition which degrades the sensor performance and stability.

Figure 3:
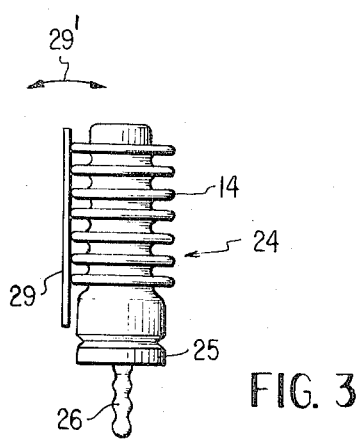
FIG. 3 illustrates a sealed bellows-bending beam arrangement in accordance with the present invention.

FIG. 3 illustrates a sealed bellows 24 having a plug 25 which is shown welded in and sealing the end of the bellows and containing a pinch-off tube 26 for purposes of partial or complete evacuation and sealing. The plug and pinch-off tube can be formed integral with the bellows or joined by welding, soldering, brazing, or the like. Sealing may be accomplished by pinching-off a tube, or welding, soldering, etc., of a small orifice in the plug. When the bellows is evacuated at a pressure below ambient, the convolutions 14 will be longitudinally compressed and the bellows length shortened. The magnitude of the foreshortening equals the pressure differential between ambient and the bellows times the bellows effective area divided by the bellows longitudinal spring rate. It is important that the amount of compression remain constant for a given pressure differential, since the sealed bellows will serve as a reference in following constructions. The bellows spring rate is proportional to the metal's modulus of elasticity. Except for a few constant modulus materials, most metals have a large thermoelastic coefficient (fractional change of modulus with temperature) on the order of several hundred parts per million per degree Fahrenheit. The thermoelastic coefficient is usually negative indicating that the modulus value decreases with increasing temperature. Thus, in most cases a metal bellows under constant compressive pressure load will continually shorten as the temperature increases. This effect can be negated by partially filling the bellows interior with an amount of inert gas, such as nitrogen or other well knwon gas, so that when the temperature increases, the gas expands and tends to lengthen the bellows by the same amount that the modulus decrease is foreshortening. The bellows length and consequently forces and torques generated by the bellows are now constant with temperature variations and an excellent reference is obtained. Bellows 24 is shown attached to a flat flexible bending beam 29 which restricts motion in all but one sensitive direction. The sealed bellows-bending beam assembly is shown in its neutral position at the ambient pressure at which it was assembled. However, if ambient pressure changes, an angluar deflection results, as indicated by the double ended arrow 29'.

Figure 4:
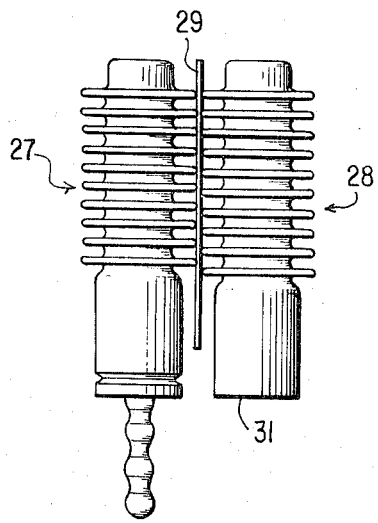
FIG. 4 shows a symmetrical construction comprising an open bellows-bending beam-sealed bellows arrangement.
Figure 4A:
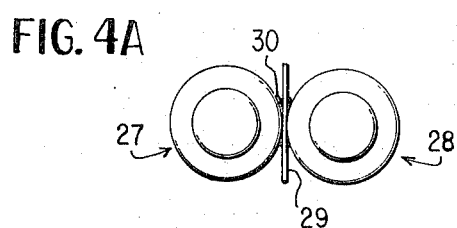
FIG. 4A is a plan view of the symmetrical construction of FIG. 4.

FIG. 4 shows a symmetrical open bellows-bending beam-sealed bellows arrangement usable as the sensitive assembly in an absolute pressure sensor. It comprises a sealed bellows construction 27, similar to that described in FIG. 3, and an open-ended bellows 28, attached to the flat flexible bending beam 29. FIG. 4A is a top view of FIG. 4 showing attachment of the bellows convolutions to the bending beam by solder joints, such as fillet 30. Each convolution may be attached to the bending beam by soldering, welding, brazing, or the like. Referring again to FIG. 4, bellows 29 is shown with the convolutions compressed relative to open bellows 29. This assumes that attachment of the bellows to the beam has been performed at about one atmosphere ambient pressure and that the sealed bellows 27 has on the order of several psi internal pressure to compensate for temperature effects on modulus. The bending beam readily flexes about an axis perpendicular to the plane of the illustration and passing through the center of beam 29 in FIG. 4, but is stiff in the two cross-axes directions. Thus, if underpressure or vacuum is applied to open end 31, a clockwise torque and angular deflection is produced. Similarly, if overpressure is applied, a counterclockwise deflection results. The amount of deflection is proportional to the applied pressure.

Figure 5:
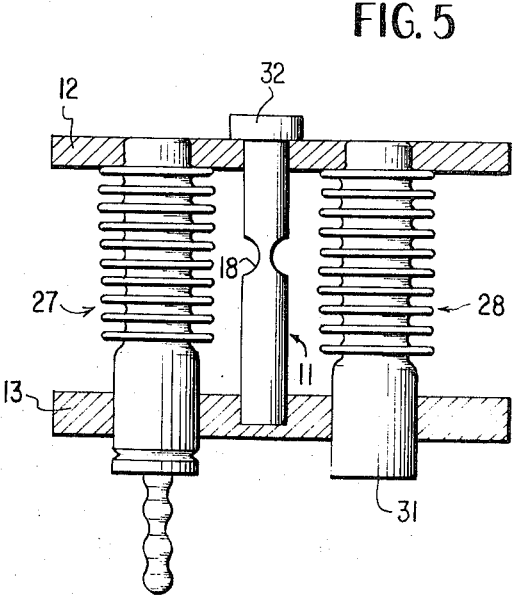
FIG. 5 shows a symmetrical combination open bellows and sealed bellows construction provided with a flexure hinge pivot of the type illustrated in FIGS. 1 and 2.

FIG. 5, in which like parts bear like reference numerals, shows a sealed bellows 27 and open bellows 28 symmetrically placed about flexure hinge pivot 11. Plates 12 and 13 space and hold the bellows-pivot arrangement. The flexure hinge has a locally necked-down portion 18 which readily permits flexing about one sensitive axis but is stiff about the two cross axes. The sensor is assembled normally at one atmosphere ambient pressure so that plates 12 and 13 are parallel and no angular deflection of flexure pivot 11 is produced under normal storage conditions of one atmosphere pressure being applied to open end 31 and the suspension system is unstressed. Upon application of pressure under one atmosphere, a clockwise deflection is produced, and when overpressure is applied, a counterclockwise deflection results. If two open ended bellows had been assembled as shown and then one bellows evacuated and sealed, the plates 12 and 13 would be fully deflected and the suspension stressed. Furthermore, extra range is obtained with the pre-sealed bellows assembly since the plates are neutral at a pressure of one atmosphere and deflect equal amounts clockwise and counterclockwise when respectively vacuum or two atmospheres absolute pressure is applied through open bellows end 31. A method of making the sensor insensitive to acceleration forces is to place a balance weight 32 of the proper size and position such that the center of gravity of the movable system, i.e., bellows 27 and 28, flexure 11, plate 12, and balance weight 32, coincide with the pivot point of the flexure. An alternate method is to physically move the flexure hinge pivot point until coincidence with the center of gravity is obtained. Thus, with the center of gravity balanced to be at the pivot point, transverse accelerations produce no deflections and have no effect on the output of the instrument.

Figure 6:
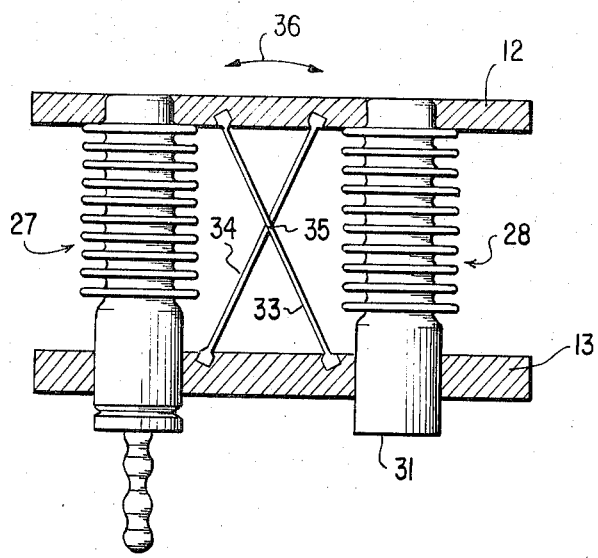
FIG. 6 shows a modified symmetrical construction with a cross spring pivot.

FIG. 6 shows a modified suspension system employing crossed flexure strips 33 and 34 which permit rotation about a single axis through point 35 as indicated by arrow 36 when over or underpressure is applied to open bellows 28.

FIG. 7 is a view with parts in section showing an overall absolute pressure transducer constructed in accordance with the present invention. The sensor is of the open bellows-flexure hinge-sealed bellows construction although the bending beam and flexure strip arrangements described previously are also applicable. Open bellows 40 and sealed bellows 41 are symmetrically placed about flexure pivot 42. The straight, tubular, open ended bellows section 46, sealed bellows end 47, as well as end 53 of flexure hinge 42, are soldered or braced into base plate 43. Supply tube 44, which is also brazed or soldered into base plate 43, provides the inlet port for the pressure fluid which communicates with bellows 40 through tubular section 46. The closed ends 55 and 56 of bellows 40 and 41 and end 54 of flexure hinge 42 are soldered or brazed to end plate 52 which is integral with sides 57 and 58 to the laterally extending annular flange 61. Flange 61 serves as the movable plate in a capacitive pickoff, as well as the support for annular forcer coil 62. Fixed capacitance plates 74 and 75 are electrically insulated from base plate 42 by circular segments 72 and 73 which, together with movable plate 61, form a differential capacitive pickoff for the servo transducer. The forcer coil 62 surrounds a permanent magnet 65 which is linearly polarized in the plate of the paper as shown in FIG. 7. An annular magnetic return ring 70 is used to complete the magnetic circuit. As shown, the flux lines go from the north pole of the magnet through the adjacent side of coil 62 around both halves of soft iron ring 70 and by way of the opposite side of coil 62 to the south pole of the magnet. A nonmagnetic spacer 96 separates the magnet 65 and annular return ring 70 from the housing 93.

FIG. 8, which is a sectional view perpendicular to that of FIG. 7, more clearly shows the shapes and relationships described previously. The bellows end caps 55 and 56 and flexure hinge end 54 are attached to end plate 52 which is integral with the moving capacitance plate and serves as a support for forcer coil 62. Not attached to the moving system but positioned between end plate 52 and coil 62 is permanent magnet 65. The magnetic return ring is completed through annular section 70.

FIG. 9 is a sectional view along line 9-9 of FIG. 7 showing receptacles 48, 49, and 50, into which the two bellows ends and flexure hinge are respectively soldered or brazed into base plate 43. Fixed capacitance plates 74 and 75 are shown as well as electrical feedthrough terminals 80, 81, 82, and 83. Fixed capacitance plates 74 and 75 are electrically attached to feedthrough terminals 80 and 81, respectively. Flexible electrical leads from the forcer coil are brought from the moving system to terminals 82 an 83. Referring to FIG. 7, movable capacitance plate 61 is integral with end plate 52 and connected through the bellows and flexure hinge to grounded base plate 43. The grounded movable plate is connected to the electronic circuitry 86 by means of flexible lead 88 to metal spacer 87. The forcer coil leads 89 and 90 and fixed capacitance plate leads 91 and 92 are connected to the electronic circuitry 86 from the opposite ends of the feedthrough terminals 82, 83, 80, and 81, shown in FIG. 9. FIG. 7 also shows electrical connector 95 through which power is supplied to the servo electronics and the output signal exits. Housing 94, through which supply tube 44 passes and connector 95 is mounted, also acts as a cover for the electrical assembly.

The moving system, consisting of the bellows, pivot, moving plate, and forcer coil, is balanced about an axis through pivot point 60 such that the assembly is insensitive to acceleration forces. Balancing may be achieved by addition of weights to the movable plate or by movement of flexure hinge 42.

Operation of the sensor will be described with reference to FIG. 7. Application of an overpressure to bellows 40 through supply tube 44 generates a force which is transmitted through end plate 52 to provide a counterclockwise torque and resultant deflection about pivot point 60. The angular deflection brings the moving capacitance plate 61 into closer proximity to fixed plate 74 while the opposite side of plate 61 moves away from fixed plate 75. The capacitance change is detected and an electrical current is sent through coil 62 in the field of permanent magnet 65 to produce a counteracting torque which restores the assembly to its null position. The current is thus proportional to and a measure of the applied pressure. A clockwise torque is produced when underpressure or vacuum is applied to supply tube 44. Movable plate 61 moves toward fixed plate 75, the capacitance change is detected, and the feedback current restores the sensor toward its null position.

Figures 10, 11:
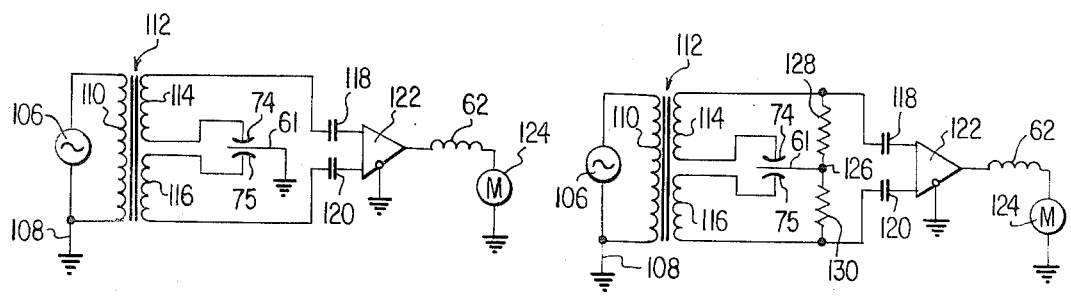
FIG. 10 shows a circuit diagram for the absolute pressure transducer of FIG. 7.
FIG. 11 shows a modified circuit diagram for the pressure transducer of FIG. 7.

FIG. 10 is a simplified circuit diagram of the pressure sensor. The circuit comprises an AC source or generator 106 operating, by way of example only, at a frequency of about 6 megahertz. One side of source 106 is grounded as at 108 and connected across it is the primary 110 of an isolating transformer 112. Transformer 112 is provided with two secondary windings 114 and 116, one side of the transformer secondaries being connected through capacitors 118 and 120 to the inputs of a differential amplifier 122. The output of amplifier 122 is proportional to the difference between the signals at its two inputs and the amplifier develops an output signal causing current to flow through the forcer coil 62, the amount of this current being indicated by a meter 124. The other sides of the transformer secondaries 114 and 116 are connected to the stationary plates 74 and 75 which, together with grounded moving plate 61, form a differential capacitor.

When plate 61 is in its center position, the signals on the secondary windings of the transformer are balanced and no signal is developed at the output of amplifier 122. However, as movable capacitor plate 61 tends to move with a deflection of the bellows-pivot assembly under pressure, an unbalance in the signal between the two inputs of the amplifier 122 occurs and a signal is developed at the output of the amplifier in the form of a current through forcer coil 62 which generates a counter-torque tending to restore capacitor plate 61 to its initial position. The amount of current flowing through forcer coil 62 to produce a torque balance condition in the transducer is proportional to the pressure differential in the two bellows and the amount of this current is indicated by meter 124 which gives a direct indication of the differential pressure.

FIG. 11 shows a modified circuit for the transducer of FIG. 1. In FIG. 11, like parts bear like reference numeral and the circuit of FIG. 11 is similar to the circuit of FIG. 10 described above with the exception that the moving plate 61 is not grounded but instead is returned to a terminal 126, i.e., is returned to the midpoint between a pair of resistors 128 and 130 connected across the differential capacitor. Resistors 128 and 130 are provided in the circuit of FIG. 11 to take the DC leakage off the plates of the differential capacitor.

It is apparent from the previous discussion that the present invention provides an improved pressure sensing element and an improved absolute pressure transducer. The unit is small, self-contained, highly accurate, and capable of operation over a large pressure range from small fractions of an atmosphere to several atmospheres. The instrument may be easily balanced to make it insensitive to acceleration forces by proper placement of balance weights.

Movement of the pivot point can be used to place the center of gravity at the pivot point, thus balancing the device and making it insensitive to linear forces. High rigidity of the pivots in the cross axes directions improves the sensor's ruggedness. Incorporation of the sensing element into a servo loop yields a direct measurement of the applied pressure. The pivots are extremely flexible about the sensitive axis, thus providing negligible mechanical restraint and making the counteracting torque generated by the electrical current a direct measure of the applied pressure. By filling a bellows with the proper amount of gas prior to sealing, a temperature insensitive pressure reference is obtained which obviates the use of a select few materials. Assembling of an open bellows-pivot-sealed bellows arrangement at a pressure corresponding to normal storage or operating conditions yields a stress free suspension system and a more stable instrument. When incorporated in a servo loop, minimum restoring current is required at this assembly pressure. Excursions of the movable assembly from its null position are possible in both angular senses, thus increasing the effective range of the sensor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A servo rebalance type pressure sensor comprising a first bellows with one open end and one closed end, a second sealed and at least partially pre-evacuated bellows, flexible pivot means, said first and second bellows being mounted on opposite sides of said pivot means, said second bellows being evacuated, partially compressed and foreshortened prior to mounting, means interconnecting said first and second bellows and said pivot means such that said pivot means is in an undeflected position under ambient pressure conditions, a torque balance servo loop including means to sense deflection of said pivot means, and means coupling said loop to both said bellows whereby said pivot means is torqued toward said undeflected position by said servo loop, whereby although said second bellows is at least partially evacuated for pressure measurement, said pivot is unstressed under ambient pressure conditions and whereby said torque balance servo loop is nulled under ambient pressure conditions thereby to increase the range of said sensor.

2. Apparatus according to claim 1 wherein said second bellows contains a temperature compensating gas below atmospheric pressure and having a gas expansion characteristic which tends to lengthen said second bellows by an amount that the modulus decrease foreshortens said second bellows with temperature increases.

3. Apparatus according to claim 1 wherein said torque balance servo loop includes a forcer coil and capacitive pickup having a portion movable with said both bellows, and a permanent magnet adjacent said forcer coil whereby current through said forcer coil generates restoring torque in response to variations of said pickup tending to restore said pivot means to said undeflected position.

4. Apparatus according to claim 3 including a meter coupled to said forcer coil for indicating the current flow through said coil.

* * * * *

UNITED STATES PATENT OFFICE
CERTIFICATE OF CORRECTION

Patent No. 3,783,693           Dated January 8, 1974

Inventor(s)   Jerome M. Paros

It is certified that error appears in the above-identified patent and that said Letters Patent are hereby corrected as shown below:

Col. 5, line 14, "undrepressure" should read --underpressure--.

Col. 6, line 19, "plate" should read --plane--; line 46, "an 83" should read --and 83--.

Col. 7, line 55, "FIG. 1" should read --FIG. 7--.

Col. 9, lines 3-4, claim 3, "said both" should read --both said--; line 6, "restoring" should read --a restoring--.

Signed and sealed this 16th day of July 1974.

(SEAL)
Attest:

McCOY M. GIBSON, JR.
Attesting Officer

C. MARSAHLL DANN
Commissioner of Patents